Figure 1:
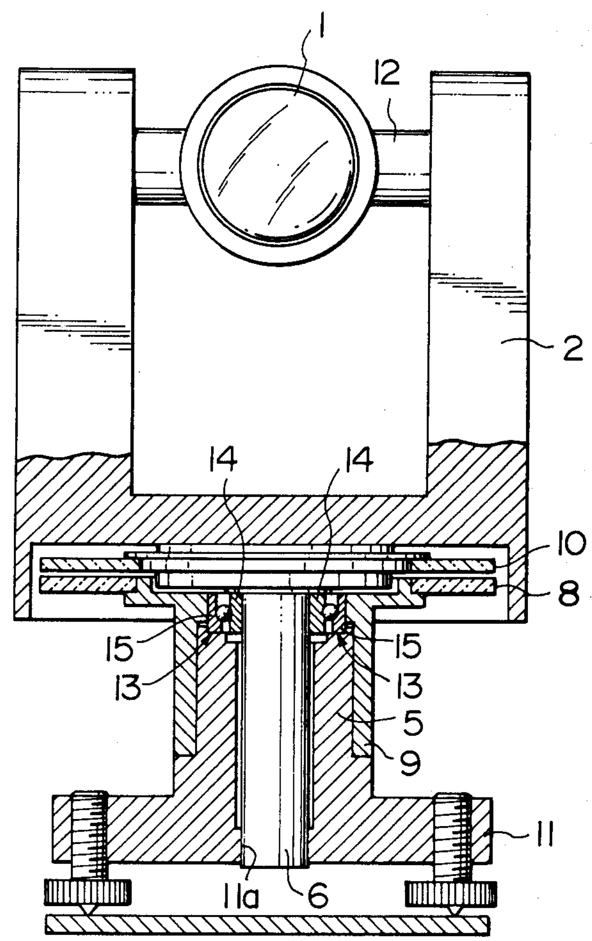

United States Patent [19]
Kobayashi et al.
[11] 4,281,463
[45] Aug. 4, 1981

[54] ROTATABLE DISC SUPPORT ARRANGEMENT FOR ANGLE MEASURING APPARATUS

[75] Inventors: Yuzi Kobayashi; Hiroshi Nishikatsu, both of Tokyo, Japan

[73] Assignee: Tokyo Kogaku Kikai Kabushiki Kaisha, Tokyo, Japan

[21] Appl. No.: 17,321

[22] Filed: Mar. 5, 1979

[30] Foreign Application Priority Data

Mar. 16, 1978 [JP] Japan ................................ 53-30334
Mar. 16, 1978 [JP] Japan ............................ 53-33871[U]

[51] Int. Cl.³ ................................................ G01C 1/00
[52] U.S. Cl. ........................................ 33/299; 33/285; 33/292
[58] Field of Search ................. 33/285, 292, 293, 290, 33/281, 282, 283, 284, 299, 286, 287

[56] References Cited

U.S. PATENT DOCUMENTS 2,164,051 6/1939 Brunson ................................ 33/299
3,930,694 1/1976 Acker et al. .......................... 33/285

*Primary Examiner*—Steven L. Stephan
*Attorney, Agent, or Firm*—Stevens, Davis, Miller & Mosher

[57] ABSTRACT

Angle measuring apparatus such as a transit has a pair of superimposed discs which are rotatable with respect to each other. One of the discs is rotatable with a viewing telescope support which has a vertically extending rotatable shaft received in a stationary shaft. A commercially available bearing is used between the shafts with the inner race fitted to the rotatable shaft and the outer race to the stationary shaft. The outer race of the bearing further carries the other of the disc.

6 Claims, 2 Drawing Figures

ROTATABLE DISC SUPPORT ARRANGEMENT FOR ANGLE MEASURING APPARATUS

The present invention relates to an angle measuring apparatus and more particularly to an angle measuring apparatus including a viewing telescope carried on a support which is rotatable about a vertical axis and provided with scales for indicating the angle of rotation of the support. One typical example of such apparatus is a transit, however, the present invention is not limited to such an application.

Conventionally, the aforementioned type of apparatus includes a rotatable shaft which is secured to the rotatable telescope support and rotatably received by a hollow stationary shaft provided on a base. The stationary shaft is formed at the upper end with a conical bearing surface which cooperates with a bearing surface formed on the lower side of the telescope support with intervention of steel balls between the cooperating bearing surfaces, whereby the telescope support is rotatably carried on the stationary shaft. In order to eliminate any play of the rotatable shaft with respect to the stationary shaft, the rotatable shaft is fitted at the lower end rotatably to a recess provided for the purpose in the base. The telescope support is provided with a scale disc which is coaxial with the rotatable shaft and has an angular scale thereon. For cooperation with the angular scale, there is provided a vernier scale or an index pointer which is prepared on a second disc carried by a rotatable member fitted to the outside of the stationary shaft. It is of course possible that the vernier of the index be provided on the disc rotatable with the telescope support and the angular scale on the other disc. Thus, throughout the descriptions, the terms "scale" and "vernier" or "index" are used as being interchangeable with each other.

In the conventional apparatus, it is required in order to ensure a smooth operation of the telescope support in a precise manner that the bearing surface on the telescope support and the conical bearing surface on the stationary shaft be of a very hard nature and fine finish. It has therefore been necessary to apply both of the rotatable and stationary shafts with hardening treatments such as quenching and thereafter with finish treatments such as homing or lapping so that the manufacturing costs of these parts have been significantly increased.

Since various types of high quality standard bearings are commercially available, such as angular ball bearings which can withstand both radial and thrust loads, the manufacturing costs of the aforementioned parts would be substantially decreased if standard bearings could be utilized. However, in the conventional arrangement, a substitution of the bearing structure comprising the bearing surfaces and the steel balls with the commercially available standard bearing may cause a noticeable error in the measurement so that the apparatus will become practically useless.

It is therefore an object of the present invention to provide an angle measuring apparatus in which standard type thrust-radial bearing means can be used without any possibility of increasing the measurement error beyond an allowable limit.

Another object of the present invention is to provide an angle measuring apparatus including a novel scale arrangement by which reading error can be significantly decreased.

According to the present invention, there is provided an angle measuring apparatus comprising a telescope support section adapted to carry viewing telescope means and rotatable about a vertical axis, a first disc coaxial with the said vertical axis and rotatable together with the support section, a second disc opposing to said first disc and rotatable about said vertical axis, one of said first and second discs having cooperating angular scale means, said support section having a rotatable shaft which is coaxial with said vertical axis and rotatable with the support section, bearing means having inner race means engaged with the rotatable shaft and outer race means which is received in a recess formed in a stationary part of the apparatus and coaxial with the vertical axis, said second disc being engaged with the outer race means.

In the previously described known arrangement, a measurement error is considered as being caused firstly by a misalignment of the rotatable shaft due to the manufacturing error in the steel balls, secondly by an eccentricity between the inner and outer surfaces of the stationary shaft and thirdly by a gap between the stationary shaft and the rotatable member carrying the mark disc. Where a commercially available bearing is used in the place of the steel balls, the misalignment error will be approximately 0.5 microns and the eccentricity and the gap can be decreased as small as 1.5 microns. Therefore, in case of a transit having a scale disc of 110 mm in diameter and finest reading of 20 seconds, the overall angle measurement error will be at most 12.7 seconds. The value however exceeds the allowable limit which is 10 seconds in accordance with the Japanese Industrial Standard. According to the arrangement of the present invention, however, the second disc which may be an index or mark disc is supported not by the outer surface of the stationary shaft but by the outer race of the bearing so that it is possible to eliminate the aforementioned error due to the eccentricity between the inner and outer surfaces of the statonary shaft. Thus, the present invention is effective to decrease significantly the overall angle measurement error. In fact, in case of a transit previously exemplified, the measurement error can be decreased to as small as 7 seconds.

According to a further feature of the present invention, the first and second discs are disposed one above the other with a gap therebetween, said gap being filled with a layer of self-lubricating material except such portion where said angular scale means is provided. Such layer may be made of a sheet of self-lubricating material such as tetrafluoroethylene and in one aspect such layer may be of an annular form disposed radially inside of the scale means. A further layer may also be provided radially outside the scale means throughout the periphery of the disc. In accordance with this feature, it is possible to maintain the gap between the first and second discs accurately for enabling an accurate reading. Further, it is also possible to prevent the discs from colliding with each other when the apparatus is subjected to an outside shock load.

Figure 2:
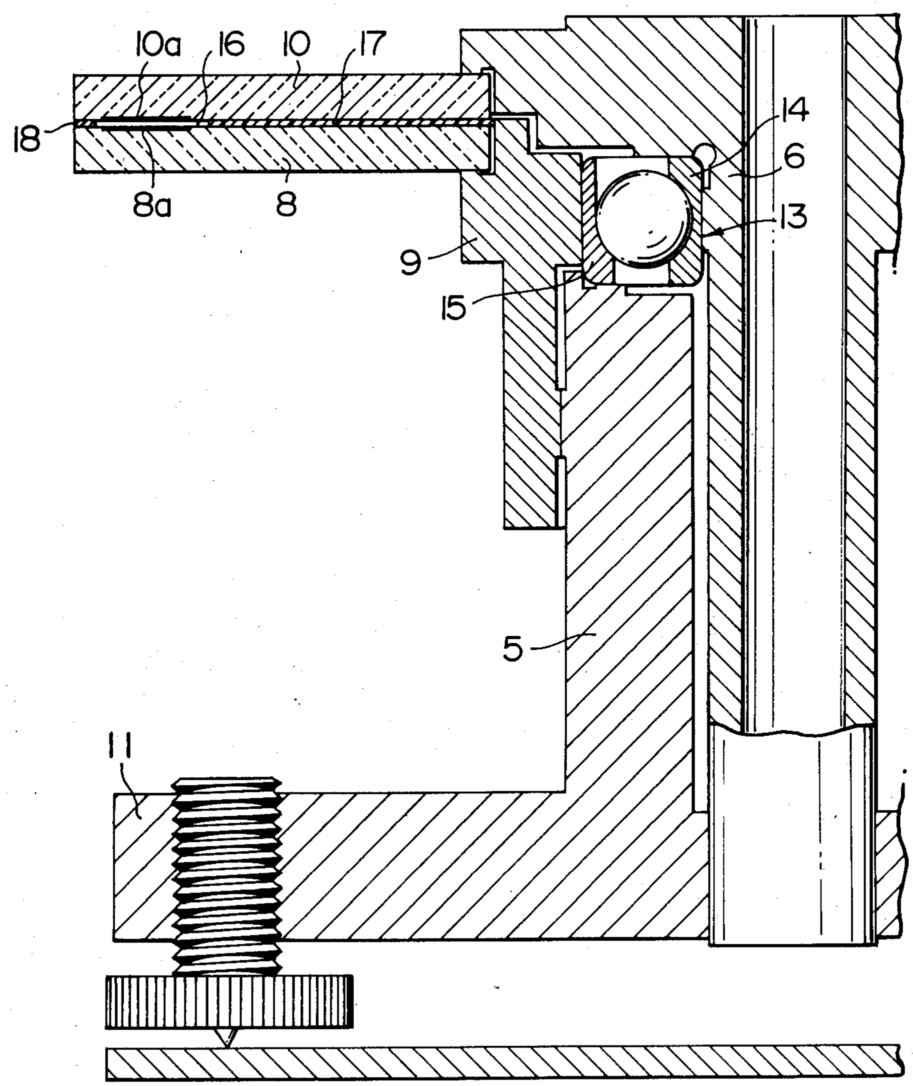

The above and other objects and features of the present invention will become apparent from the following descriptions of a preferred embodiment taking reference to the accompanying drawings, in which;

FIG. 1 is a partially sectioned end view of a transit embodying the feature of the present invention; and, FIG. 2 is an enlarged fragmentary sectional view of the disc arrangement in the transit shown in FIG. 1.

Referring to the drawings, a viewing telescope 1 is shown as being carried by a telescope support 2 through a trunnion 12 for swinging movement in a vertical plane. As in a conventional structure, the support 2 has a rotatable shaft 6 which is integral with or secured to the support 2 and extending vertically downwards from the bottom of the support 2. The transit further includes a base 11 having a vertically extending stationary shaft 5 which receives a rotatable shaft 6. Between the shafts 5 and 6, there is disposed a thrust-radial type ball bearing 13. More specifically, the bearing 13 has an inner race 14 which closely fits with the rotatable shaft 6. The bearing 13 further has an outer race 15 which is received by a counterbore formed for the purpose at the upper end of the stationary shaft 5. If necessary, the outer race 15 may be adhesively secured to the stationary shaft 5.

In order to eliminate or substantially decrease lateral play of the rotatable shaft 6, it is received at the lower end portion by a bore 11*a* formed in the base 11. The outer race 15 of the bearing 13 is fitted with a disc support 9 which has a lower end portion rotatably engaged with the outer surface of the stationary shaft 5. The disc support 9 carries a vernier disc 8 which cooperates with a scale disc 10 disposed above the disc 8.

It will be noted in the illustrated structure that the radial position of the disc support 9 carrying the vernier disc 8 is determined only by the bearing 13 which is fitted to the rotatable shaft 6 so that the result of the measurement is not affected by the possible eccentricity between the outer and inner surfaces of the stationary shaft 5. Where desired, a film of self-lubricant material such as tetrafluoroethylene may be disposed between the outer race 15 and the upper end of the stationary shaft 5 and the disc support member 9 may be fitted to the bearing outer race 15.

Referring to FIG. 2, it will be noted that the discs 8 and 10 are disposed with a gap 16 therebetween. An angular scale 10*a* is provided on the lower surface of the scale disc 10 and a vernier scale 8*a* on the upper surface of the disc 8. The vernier scale 8*a* may be substituted by an index or a mark cooperating with the scale 10*a*. The gap 16 is filled with a layer 17 of tetrafluoroethylene at the area radially inside of the vernier scale 8*a*. An annular sheet 18 of tetrafluoroethylene may also be disposed in the gap 16 at an area radially outside of the angular scale 10*a*. The sheets or layers 17 and 18 function to maintain the gap 16 substantially uniform so that it is effective in eliminating or decreasing a reading error which may otherwise be produced due to non-uniformness of the gap between the discs 8 and 10. Further, the radially outer layer 18 serves to prevent dust or foreign material from entering the gap 16.

The invention has thus been shown and described with reference to a specific embodiment, however, it should be noted that the invention is in no way limited to the details of the illustrated structures but changes and modifications may be made without departing from the scope of the appended claims.

We claim:

1. An angle measuring apparatus comprising a telescope support section adapted to carry a viewing telescope means and rotatable about a vertical axis, a first disc coaxial with the said vertical axis and rotatable together with the support section, a second disc opposed to said first disc and rotatable about said vertical axis, said first and second discs having cooperating angular scale means, said support section having a rotatable shaft which is coaxial with said vertical axis and rotatable with the support section, a stationary member, bearing means having an inner race means engaged with the rotatable shaft and an outer race means which is received in a recess formed in said stationary member and coaxial with the vertical axis, and disc support means supporting said second disc and being rotatable about said vertical axis relative to said stationary member and fitted to the outer race means.

2. An angle measuring apparatus in accordance with claim 1 in which said outer race means of the bearing means is secured to said stationary member and said disc support means is rotatable with respect to the outer race means.

3. An angle measuring apparatus in accordance with claim 1 in which said outer race means of the bearing means is rotatable with respect to said stationary member and is secured to the disc support means.

4. An angle measuring apparatus in accordance with claim 1 in which the first and second discs are disposed one above the other with a gap therebetween, said gap being filled with a layer of self-lubricating material except such portion where said angular scale means is provided.

5. An angle measuring apparatus in accordance with claim 4 in which said layer is of an annular form disposed radially inside of the scale means.

6. An angle measuring apparatus in accordance with claim 5 which further includes a layer of self-lubricating material disposed radially outside of the scale means.

* * * * *